Dec. 7, 1937.  E. COUBRAY  2,101,384
MEANS FOR USE IN AUTOMATICALLY WEIGHING PREDETERMINED
QUANTITIES OF DISCRETE MATERIALS
Filed March 26, 1936  2 Sheets-Sheet 1

Fig.1

INVENTOR
EDWIN COUBRAY
By Emil Bönnelycke
ATTORNEY

Dec. 7, 1937. E. COUBRAY 2,101,384
MEANS FOR USE IN AUTOMATICALLY WEIGHING PREDETERMINED
QUANTITIES OF DISCRETE MATERIALS
Filed March 26, 1936 2 Sheets-Sheet 2

INVENTOR
EDWIN COUBRAY
By Emil Bönnelycke
ATTORNEY

Patented Dec. 7, 1937

2,101,384

UNITED STATES PATENT OFFICE 2,101,384

MEANS FOR USE IN AUTOMATICALLY WEIGHING PREDETERMINED QUANTITIES OF DISCRETE MATERIALS

Edwin Coubray, Auckland, New Zealand

Application March 26, 1936, Serial No. 71,025
In New Zealand May 18, 1935

7 Claims. (Cl. 249—32)

This invention relates to means that have been devised for use in packing tea, sugar, rice and other commodities of a like discrete nature, into packages or containers in predetermined quantities represented by weight, but which means are also adaptable for use in respect of any other class of discrete material that is required to be packed in quantities determined by weight.

The invention provides for the combination with a storage bin adapted to contain a bulk quantity of the material, of means whereby individual quantities of a predetermined weight may be fed into containers or packages placed beneath to receive them, the whole operation being carried out automatically under the control of electrically operated devices so that the weighing and delivery of the measured quantities goes on continuously so long as the electric current supply to such devices is maintained. This supply is governed in the usual manner by a control switch.

The apparatus designed for carrying out the invention works upon a system under which the material is fed from the storage bin through a feed spout of the novel form hereinafter described, into a vibrating tray from which it is shaken into the weigh pan of a balance lever or beam type of scale which by its tipping is designed to actuate means whereby the feed from the spout is shut off and opened by the up and down movements of the scale beam, as the weigh pan falls with the deposit of the material therein and rises with its delivery therefrom. The storage bin has an auxiliary feed spout leading therefrom into the vibrating tray through which there is a constant trickle discharge of the material into such tray. The shutting off of the main feed is designed to take place when the scale beam has moved through the greater portion of its movement by the deposit in the scale pan of an amount slightly less than the full weight to be measured out, the amount then remaining to make up the full weight, being supplied by the trickle supply from the vibrating tray, until the beam moves its full distance, when the tray is stopped from vibrating thus cutting off the whole supply to the weigh pan. This vibrating tray is actuated by electrically controlled means, the current supply to which is governed by the movement of the scale beam, to be cut off when the beam tips to its full extent, and to be restored as it moves back to its other position.

The apparatus also embodies electrically controlled means which are also actuated by the tipping of the scale beam, for discharging the weigh pan's contents therefrom as it moves down with its full weight.

It also embodies a construction of weigh pan under which it is made in two vertical divisions, each having a discharge door in its lower end, the two doors being so made and connected that when one opens, the other closes, and vice versa, and under which also, the delivery from the vibrating tray is alternately directed into the two divisions by the operation of means combined with the discharge doors, which cause the material to be directed into the division which for the time being has its door closed. This control of the reception and delivery of measured quantities from the respective divisions is governed by the electrically actuated means beforementioned. The use thereof allows for the weighing being carried on without any appreciable break.

The invention is illustrated in the accompanying drawings and will be hereinafter fully described in relation to the drawings, in which:—

Figure 1 is a general view of the whole apparatus displayed to some extent in diagrammatic form, in order to illustrate its working.

Figure 5:
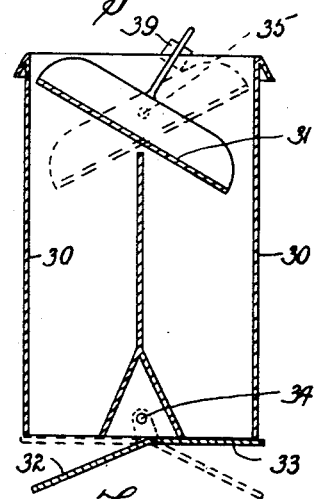

Figure 5 a sectional side elevation, and

Figure 6:
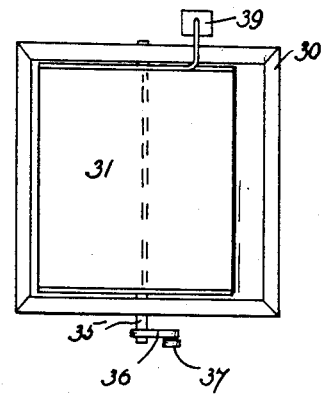

Figure 6 a plan of the weigh pan employed.

In giving effect to the invention in its novel detail features, the delivery or feed from the storage bin 10 is effected as to the main feed, through a metal tube 11 of circular form in section having a rubber sleeve 12 combined therewith to form its outlet. This ensures of an even flow of the material, the circular form of the tube maintaining an even gravity head while the rubber sleeve outlet causes a frictional resistance which checks a too rapid flow. Also the use of such sleeve 12 allows for the volume of flow being readily varied by choking the outlet more or less by means of a pressure clamp 13 that is provided for such purpose, such clamp being capable of adjustment through the set screw 14.

This main spout or outlet 11 from the bin 10 has combined with it a shut off plate 15 that is so mounted as to move in and out laterally beneath the outlet by suspension upon hanger arms 16 and when in the inward position to close such outlet and in the outward position to leave it unimpeded. This in effect forms a gate valve and it is connected with the scale beam 17 of the apparatus by mechanism providing that the movement of the beam as it tips in the direction caused by its control weight, that is to the normal position, will open the gate valve, and as it tips in the other direction, will close the valve. This is effected by providing a crank arm extension 18 of the hangers 16 and in providing a tipping bar 19 above the scale beam, one end of which is articulated to the crank arm and the other end is engaged by a rod 20 extending up from the weight end of the scale beam and overlying the tipping bar. The bar is thus tipped down at its outer end when that end of the scale beam drops and in this movement swings the plate 15 out. An adjustable weight 21 is mounted on the other end of the bar and serves to tip it down when the pan end of the beam drops and in this movement swings the plate 15 inward.

The trickle outlet from the storage bin is formed by a small tube 22, uncontrolled in any way, which leads downward to alongside the outlet from the main feed.

The vibratory tray mechanism for feeding the material into the pan of the scales, comprises a tray 25 that is formed with a plain edge in its front and is attached at its rear to the pole piece 26 of an electro-magnet 27 of solenoid type. This is mounted on a tipping frame 28 that positions the tray 25 beneath the feed outlets 11 and 22 from the storage bin to provide that the angle of inclination of the tray down to its free edge may be varied at will in order thereby to regulate the rate of feed from the tray to suit the classes of materials being weighed. This tray is caused to vibrate by the in and out movements of the solenoid pole piece or core, caused by the alternate energizing and de-energizing of the magnet by make and break apparatus combined therewith in the well known manner of an electric bell or buzzer apparatus.

Figure 4:
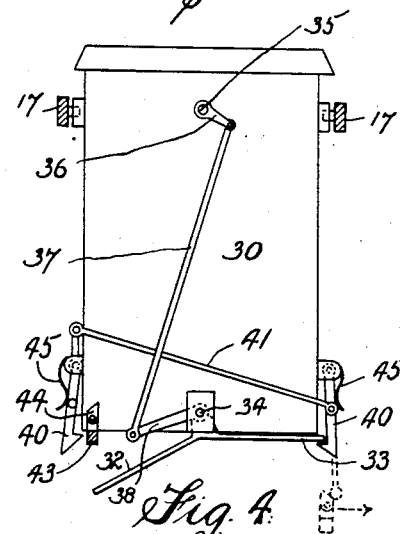
Figure 4 is a side elevation.

The scale pan 30, as mentioned, is divided into two divisions, see Figures 4 to 6, and within its top is mounted a tilting guide plate 31 which may be tipped to incline downward into either division, and this is disposed beneath the vibrating tray 25 to catch the material shaken over its edge and to deflect it into the division in the pan into which it is for the time inclined. The bottom of the pan has a double flap door pivoted therein the two flaps 32 and 33 being so disposed in relation to the pivots 34 that, when tipped, one moves up to form a bottom to the pan division on its side, while the other moves down from a position in which it had closed the second division, to a position in which it opens the bottom to free the contents to drop clear.

This double flap door 32—33, and the tilting deflector plate 31 at the pan top, are connected together by mechanism to provide that as one flap closes its division, the plate is moved across to direct the material into such division, and vice versa. For this purpose the pivot 35 on which the plate 31 is supported is (outside the pan) provided with a crank arm 36 and such crank arm is connected by connecting rod 37 with a crank arm 38 on the pivot 34 of the flap doors, to convey the reverse motion to the plate. A weighted arm 39 on the plate causes a positive throw over to each side.

The weight of the material in each division is designed to effect the opening of its flap discharge door and the consequential closing of the other and tipping of the deflector plate. Each flap however is locked in its closed position by a detent catch 40 pivotally hung from the pan side, the two catches being connected by means of the rod 41 to actuate reversely through the same operating means. The flap closing the charged division is released to open, when the proper quantity of material has been fed into the division, by the de-energizing of an electro-magnet 42 with which an armature forming lever 43 is combined, which lever when released from the magnet, actuates through the action of a spring 43A, a trip 44 engaging the said detent, and moving it out and then being adapted to move back over the detent when the armature is again attracted to the magnet. Either detent may be thus operated as by reason of their connection, they both move out together. They are kept normally in an inward position to engage and hold the respective flaps as they swing up to the closed position, by means of suitable springs, as those shown at 45.

The magnet 42, as also the solenoid magnet 27, are affixed to any approved fixtures disposed in the correct relative position to the scale beam apparatus.

Figure 2:
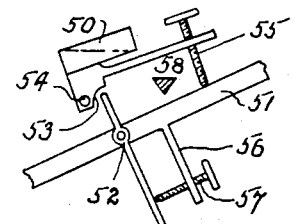
Figures 2 and 3 are sketches illustrating the action of a gravity electric switch embodied in the apparatus to control its operations.
Figure 3:
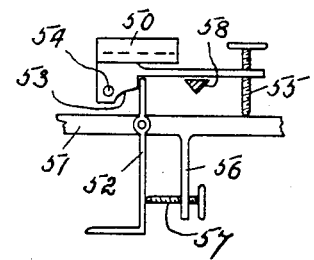

The supply of electric current to the vibrating tray magnet 27 (solenoid coil), and the detent releasing magnet 42, is effected through a gravity switch mechanism, for instance the mercury switch 50, that normally is held in a position to close the circuit as in Figure 2 but is capable of tipping to open the circuit as in Figure 3 when released from the means maintaining it in its normal position, and then to be restored to the normal position by such control means when the influences releasing it therefrom are removed.

This switch apparatus is combined with the scale beam 17 and comprises an arm 51 adapted to move with the beam and which at the weighing side of the beam's axis supports the gravity switch 50 in its normal position so that with the downward and upward movements of this end of the beam, the switch is allowed to open and is caused to close. This switch, however, is held from the downward movement with its supporting arm during the first portion of the beam's downward movement (during which period the main portion of the feed into the weigh pan has taken place and at the end of which the said feed is cut off while the trickle feed continues) and is prevented from dropping until the beam 17 has moved down to its full amount, by means of a counterweighted pawl 52 pivoted on the side of the arm 51 and the pawl end of which engages with a cam surface 53 on the lower side of the switch so shaped and disposed that as the arm 51 moves down, the pawl end moves across its cam face as in Figure 2, until when the arm has moved right down, the pawl trips from the cam and allows the switch to drop as in Figure 3. When the arm 51 moves up again with the upward movement of the beam, the pawl 52 is swung in a clockwise direction away from screw 57 until the switch is raised to a point to allow the pawl, by reason of its counterweight to swing in beneath the switch as shown in Fig. 2, to engage it again. The lateral extension carried by the lower end of pawl 52 is the counterweight and is so positioned that the center of gravity of the pawl lies to the left of the body portion thereof, as indicated in Figs. 1–3. Thus, the normal position assumed by pawl 52 is that shown in Fig. 2.

Means for adjusting and controlling the accurate movements of these parts are provided. For these purposes the gravity switch is mounted on an axis 54 and its tipping end rests on the arm 51 through a set screw 55. The arm 51 has a depending extension 56 and through this a set screw 57 passes to engage the pendent end of the pawl 52. When the arm swings up to close the switch the pawl swings in beneath it by its gravitational action and then as the arm moves down, the set screw 57 engages the pawl and swings it across, to trip the switch in the manner described and shown. A stop 58, which may be made adjustable, is provided to limit the downward movement of the switch. The adjustment of the set screws 55 and 57 will regulate the movements of the switch in relation to the scale beam's movements.

The different parts of the mechanism embodied in the apparatus may be balanced by adjustable weights to cause the positive throw over operations thereof.

The scale beam may be controlled by dash-pot mechanism to control its tipping actions, as for instance by means of a plate 60 extending down from its underside, at its axis, and positioned within a liquid holding chamber 61 having provision for the slow transfer of the liquid from one side of the plate to the other as it moves across with the tipping of the beam.

The scale pan discharges its weighed quantities into any suitable chute means 62 whereby these may be guided into the individual containers or cartons for package.

The electric connections for the magnets and gravity switch are arranged to provide that the current supply to both magnets shall be controlled by the movements of the gravity switch brought about by the rising and falling of the scale beam. A conductor 64 extends from switch 50 and is connected by branches 64a and 64b with magnets 27 and 42, respectively. Another conductor 65 extends from switch 50 to a battery or other source of power 67. A switch 66 connects the battery to branch conductor 65a and 65b, which connect with magnets 27 and 42, respectively. The winding of magnet 27 is connected to the breaker points 68 to complete the circuit. Upon closing switches 50 and 66, current flows from the source 67 through conductor 65 to switch 50, from switch 50 in parallel through branches 64a and 64b through magnets 27 and 42, through branches 65a and 65b to switch 66, and back to the source 67. While the mercury form of gravity switch has been shown and described other forms of automatic switches controlled by the scale beam's movements may be employed instead thereof.

I claim:

1. Means for the purposes herein described comprising the combination with an overhead storage bin having a delivery spout, a weighing scale beam having a receiving pan on one end disposed beneath the said spout, and means operable by the movement of the beam to control the delivery from said spout, to cause it to be opened when the pan end rises and to close when such end falls, of a tray disposed horizontally beneath the said spout to catch the material falling therefrom and to direct it into the weighing pan, and which tray is so mounted as to be adapted to be shaken reciprocally in a horizontal plane, an electric solenoid magnet to the pole piece of which the said tray is attached, a tipping switch controlling the supply of electric current to such magnet and mounted in association with the said scale beam to close when the weighing pan end is in the raised position and to open when such end falls, and detent apparatus for holding such switch in its closed position until the scale beam has dropped to its full extent.

2. In means for the purposes described comprising the combination with a scale beam and with a weighing pan carried upon one end thereof, of electro-magnetic means for controlling the delivery of material to the said weighing pan and the discharge of material from the pan, electric supply circuits for such means, a pivoted gravity switch adapted to close the circuits when raised and to open the circuits when it falls, and a tipping lever disposed alongside the said scale beam and tipping therewith and adapted when raised to lift the gravity switch and when lowered to allow it to fall.

3. Means for the purpose herein described according to claim 2, in which the said gravity switch has detent means combined with it and co-acting with the said lever whereby the switch is engaged when raised and held raised while the lever is in its raised positions and is released when the lever reaches the downward extent of its movement.

4. In an automatic weighing device, an overhead bin having a delivery feed spout extending downwardly from its bottom, a tray positioned to receive material from said spout, a weighing scale having a weighing pan positioned to receive material from said tray, means for controlling the discharge of material from the spout, and a tube of relatively small cross-section extending downwardly from said bin to continuously discharge material at a low rate into said tray.

5. In an automatic weighing device, a scale beam, an arm carried by said beam, a pivoted mercury switch, means carried by said switch and engaging said arm for tipping said switch to a closed position, and means carried by said arm for retaining said switch in a closed position until said arm is displaced through a predetermined distance.

6. In an automatic weighing device, a scale beam, an arm carried by said beam, a pivoted mercury switch, means carried by said switch and engaging said arm for tipping said switch to a closed position, said switch having a cam surface thereon, and a pawl carried by said arm and engaging said surface during a predetermined displacement to retain said switch closed.

7. In an automatic weighing device, a scale beam, an arm carried by said beam, a pivoted mercury switch, adjustable means carried by said switch and engaging said arm for tipping said switch to a closed position, said switch having a cam surface thereon, a pawl carried by said arm and engaging said surface during a predetermined displacement to retain said switch closed, and adjustable means for shifting the pawl out of engagement with said cam to permit opening of said switch.

EDWIN COUBRAY.